Jan. 6, 1925.
A. J. PERKINS ET AL
LIFTING JACK FOR AUTOMOBILES
Filed Dec. 27, 1921
1,521,646
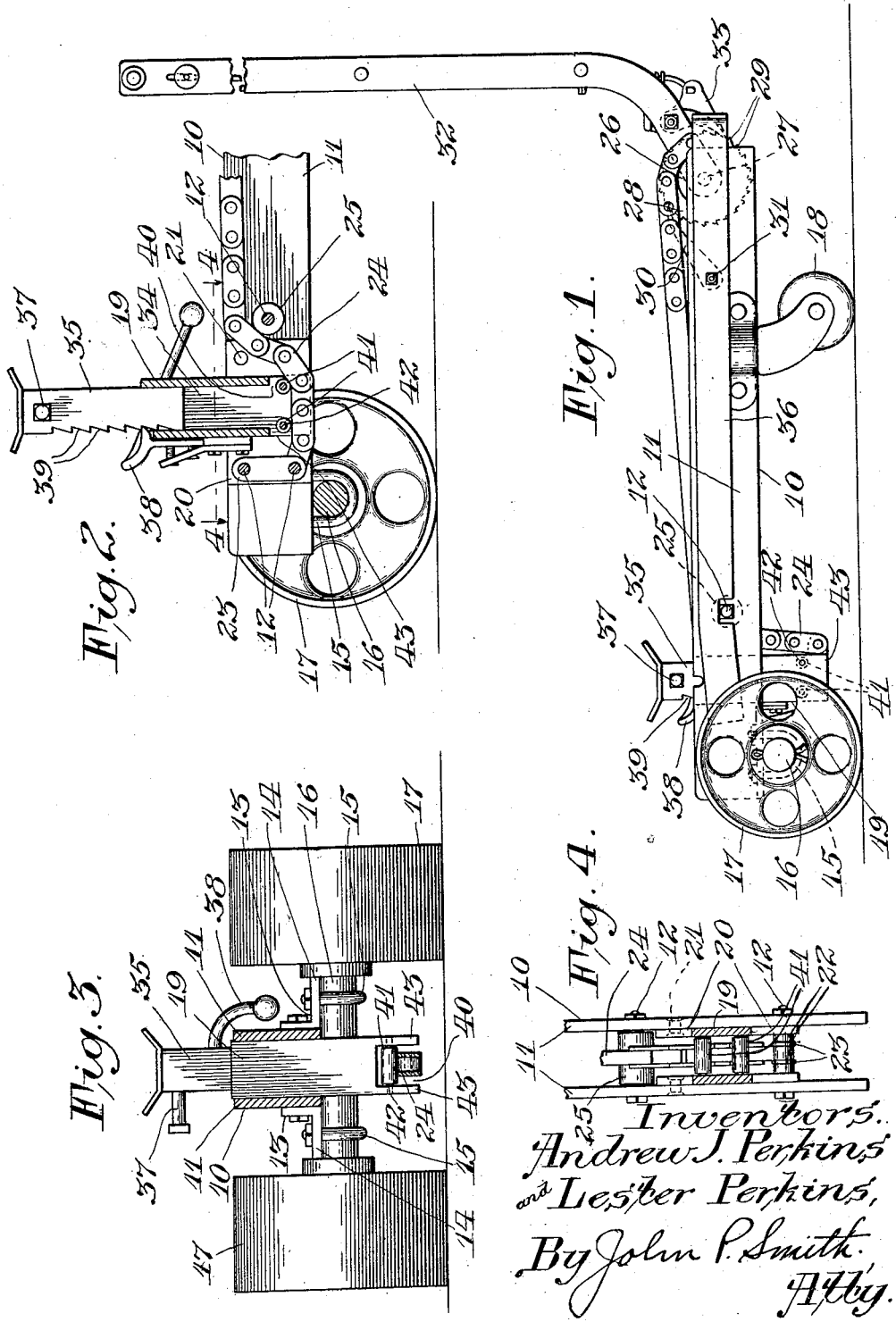

Patented Jan. 6, 1925.

1,521,646

UNITED STATES PATENT OFFICE.

ANDREW J. PERKINS AND LESTER PERKINS, OF CHICAGO, ILLINOIS, ASSIGNORS TO THE YELLOW JACK-IT MANUFACTURING CO., OF CHICAGO, ILLINOIS, A CORPORATION OF ILLINOIS.

LIFTING JACK FOR AUTOMOBILES.

Application filed December 27, 1921. Serial No. 524,894.

*To all whom it may concern:*

Be it known that we, ANDREW J. PERKINS and LESTER PERKINS, citizens of the United States, and residents, respectively, of Chicago, in the county of Cook and State of Illinois, and of Chicago, in the county of Cook and State of Illinois, have invented certain new and useful Improvements in Lifting Jacks for Automobiles, of which the following is a full, clear, and exact specification.

Our invention relates to lifting jacks, and more particularly to a portable jack for use in connection with loaded trucks and other heavy vehicles.

One of the objects of the invention is to provide a portable jack so constructed that it may be placed under one of the axles of the loaded truck, or other heavy vehicles, and may be used in guiding the vehicle from one position to another.

A further object is to provide a jack so constructed that different lengths of lifting members may be quickly interchanged to take care of variations of height and the different vehicle axles.

A further object is to provide a device which is well adapted for the purpose for which it is designed and by use of which the vehicle may be quickly raised or lowered with the least amount of effort on the operator's part.

One embodiment of our invention is illustrated in the accompanying drawings, and in these drawings:

Fig. 1 is a side elevational view of the lifting jack embodying our improvement;

Fig. 2 is an enlarged sectional view showing the manner in which the lifting member is supported upon the flexible chain;

Fig. 3 is rear elevational view of Fig. 2; and

Fig. 4 is a cross sectional view taken on the line 4—4 in Fig. 2, looking in the direction of the arrows.

As illustrated in the drawings, our improved lifting jack comprises a longitudinal frame 10, preferably constructed of side bars 11 which are secured by a series of bolts 12. The rear end of the bars 11 have secured to their outer faces, brackets 13, angular in section, and the horizontal portions 14 of these brackets carry U-shape bearing members, in which is journaled an axle 16, which carries at its outer ends wide face truck wheels 17, cotter pins or any other well known means being provided between the truck wheel and the outer ends of the shaft for the purpose of securing the wheels in place. The forward end of the jack is supported on a pair of castor wheels 18 (only one of which is shown) pivotally secured to the main frame members 11.

Slidably mounted between the longitudinal frame members 11 is a lifting member 19 guided in its movements by guiding plates 20 secured by means of rivets 21 and bolts 12 to the inner sides of the frame members 11. Positioned between the rear ends of the frame members 11 are spacing members 22 and link 23 held securely fixed by means of the bolts 12. By this construction it will be seen that both ends of the link 23 are securely fastened to the frame. Pivotally connected to the link 23 is a flexible chain 24 extending forwardly and passing over a roller 25 journaled on the forward bolt 12 fixed to the frame members 11. The forward end of the flexible chain 24 is connected to a drum 26 journaled on the shaft 27 carried by the frame member 11. Securely fixed to the drum 26 is a ratchet wheel 28 provided with ratchet teeth 29 adapted to engage a spring pressed pawl 30 pivoted to the frame at 31. The pawl 30 normally prevents the unwinding of the chain 24 from the drum 26, thus holding the lifting member 19 in the elevated position. Pivotally mounted on the shaft 27 is an operating hand lever 32 provided with a spring pressed pivoted pawl 33 adapted to engage the ratchet wheel 28 in the normal operation of oscillating the lever 32 for winding the chain 24 on the drum 26. For a more detailed description of the construction and operation of this operating lever and winding drum mechanism see our Patent No. 1,322,941 dated Nov. 25, 1919.

Our improved interchangeable lifting jack comprises the lifting member 19 which is substantially square in cross section and provided with a longitudinally extending square aperture 34 adapted to receive an extensible member 35. Pivoted to the frame 11 at 31 is a foot lever 36 which may be manipulated to raise the extensible member 35, by the operator depressing that portion of the lever forward of the pivot 31. When the forward portion of the lever 36 is thus depressed the rearward portion thereof engages a lug 37 formed on the side of the extensible member 35 and raises the extensible member to the desired height. The extensible member 35 is held in its elevated position by means of a gravity pawl 38 pivoted to the lifting member 19 and engageable with a plurality of teeth 39 formed on said member. For a more detailed description of the construction, see our pending application Serial No. 489,991 filed Aug. 5, 1921. The lower end of the lifting member 19 has its forward and rearward sides slotted as shown at 40 in Fig. 3 in a manner to permit two oppositely disposed rollers 41 to be journalled on the bolts 42. By this arrangement the downwardly extending sides 43 of the lifting member 19 form guides for the chain 24 and maintains the chain centrally under the rollers.

It will be noted from the above description that a device has been provided in which the lifting member 19 rests upon the chain 24 and is guided in in its adjustment by the guiding members 20. And furthermore that the lifting member 19 is so supported that the same may be withdrawn upwardly and one of a different height substituted in its place to take care of greater variation in height of trucks than can be taken care of by the extensible member 35.

Briefly the operation of our improved lifting jack is as follows:

Assuming that a truck or vehicle is to be lifted, the jack is positioned beneath the axle, then the operator depresses that portion of the foot lever 36 forward of the pivot 31, thereby raising the rear portion of the lever and thus elevates the extensible member 35 by the lever engaging the lug 37, lifting the extensible member 35 until it comes into contact with the axle of the vehicle. The lever 32 is manipulated or oscillated rearwardly and forwardly in a manner to wind the forward end of the flexible chain 24 about the drum 26, thus drawing the chain over the roller 25 and elevating the lifting member 19 from the position shown in Fig. 1 to that shown in Fig. 2. In the event that the extensible member 35 and lifting member 19 fail to elevate the truck to the desired height, the lifting member 19 may be withdraw upwardly and one of greater height substituted.

From the above description, it will be seen that we have provided a simple and efficient device and one in which the lifting member may be quickly changed to meet various requirements of different vehicles.

While we have described in the above specification one embodiment which our invention may assume, it should be understood that the invention is capable of modification, and that modification may be employed without departing from the spirit and scope of the invention as expressed in the following claims.

We claim:

1. In a lifting jack, a longitudinally extending frame, a winding drum positioned at the forward end of said frame, a lifting member slidably positioned at the rearward end of said frame, a flexible chain fixed to the rear end of said frame and connected to said drum and means for supporting said lifting member on said chain.

2. In a lifting jack, a frame, a winding drum mounted on said frame, a chain connected to said frame and fixed to said drum and a lifting member removably supported on said chain.

3. In a lifting jack, a frame, a winding drum mounted on said frame, a chain connected to said frame and fixed to said drum and a lifting member carried by said frame and having oppositely disposed rollers engageable with said chain for lifting said member.

4. In a lifting jack, a frame, a flexible lifting element fixed to said frame, a lifting member removably resting on said flexible element and means for tightening said element and raising said member.

5. In a lifting jack, a frame, a flexible lifting element fixed to said frame, a lifting member removably supported on said flexible element, rollers positioned between said lifting member and said flexible member and means comprising the extended sides of said lifting member for guiding said flexible element on said roller.

6. In a lifting jack, a frame, a winding drum mounted at the forward end of said frame, a chain fixed adjacent the rear and lower side of said frame and connected to said drum, a lifting member having a longitudinally extending chamber adapted to receive an extensible member, a pair of rollers positioned adjacent the forward and rearward sides of said lifting member in a manner to engage said chain and means comprising an operating hand lever for winding said chain on said drum and raising said lifting member.

7. A lifting jack comprising a frame, a winding drum mounted on said frame, a roller carried by said frame, a lifting member adjustably mounted in said frame an extensible member adjustably mounted in said lifting member, and a chain connected to said frame and extending beneath said first named member and over said roller for adjusting said lifting member.

8. A lifting jack comprising a longitudinally extending frame, a winding drum positioned at the forward end of said frame, a lifting member positioned at the rearward end of said frame, a roller journaled on said frame in advance of said lifting member, and a flexible element having one end fixed to said frame and the other end thereof secured to said drum, and its intermediate portion thereof extending beneath said lifting member and over said roller for adjusting said lifting member in said frame.

In testimony whereof we affix our signatures, in the presence of two witnesses.

ANDREW J. PERKINS.
LESTER PERKINS.

Witnesses:
  CHAS. G. SEIPP,
  A. H. BLOOM.